United States Patent
Friedlander et al.

(10) Patent No.: US 12,052,274 B2
(45) Date of Patent: Jul. 30, 2024

(54) TECHNIQUES FOR ENRICHING DEVICE PROFILES AND MITIGATING CYBERSECURITY THREATS USING ENRICHED DEVICE PROFILES

(71) Applicant: Armis Security Ltd., Tel Aviv-Jaffa (IL)

(72) Inventors: Yuval Friedlander, Petah-Tiqwa (IL); Gil Ben Zvi, Hod Hasharon (IL); Tom Hanetz, Tel Aviv (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 323 days.

(21) Appl. No.: 17/483,360

(22) Filed: Sep. 23, 2021

(65) Prior Publication Data
US 2023/0088415 A1    Mar. 23, 2023

(51) Int. Cl.
*H04L 29/06* (2006.01)
*G06N 5/04* (2023.01)
*H04L 9/40* (2022.01)

(52) U.S. Cl.
CPC ........... *H04L 63/1425* (2013.01); *G06N 5/04* (2013.01); *H04L 63/102* (2013.01)

(58) Field of Classification Search
CPC ..... H04L 63/1425; H04L 63/102; G06N 5/04; G06N 5/025
See application file for complete search history.

(56) References Cited

U.S. PATENT DOCUMENTS

| 8,468,244 | B2 | 6/2013 | Redlich et al. | |
|---|---|---|---|---|
| 9,635,049 | B1 | 4/2017 | Oprea et al. | |
| 10,333,988 | B2 * | 6/2019 | Porras | H04L 63/107 |
| 11,057,393 | B2 * | 7/2021 | Coffing | G06Q 20/40 |

(Continued)

FOREIGN PATENT DOCUMENTS

| JP | 5301669 B2 | 9/2013 |
|---|---|---|
| JP | 2018521430 A | 8/2018 |

(Continued)

OTHER PUBLICATIONS

International Search Report and Written Opinion from PCT/IB2022/057676, dated Feb. 12, 2023, 10 pages.

*Primary Examiner* — Mohammad A Siddiqi
(74) *Attorney, Agent, or Firm* — Perkins Coie LLP (57) ABSTRACT

Systems and methods for device profile enrichment. A method includes determining a plurality of distributions of device attributes with respect to a plurality of fields of a predefined device profile schema; generating a plurality of inference rules based on the plurality of distributions of device attributes, wherein each inference rule indicates at least one required device attribute and at least one inferred device attribute; creating an ordered set of inference rules including the plurality of inference rules organized with respect to a plurality of scores, each score corresponding to one of the plurality of inference rules, wherein the score for each inference rule is determined based on the at least one required device attribute of the inference rule; and enriching at least one device profile by iterating the ordered set of inference rules, wherein enriching a device profile includes adding at least one device attribute value to the device profile.

19 Claims, 4 Drawing Sheets

(56) References Cited

U.S. PATENT DOCUMENTS

| | | | |
|---|---|---|---|
| 2008/0039058 A1* | 2/2008 | Ray | H04L 67/04 |
| | | | 455/414.3 |
| 2010/0023604 A1* | 1/2010 | Verma | H04L 41/0853 |
| | | | 709/221 |
| 2013/0167196 A1* | 6/2013 | Spencer | H04L 67/303 |
| | | | 370/254 |
| 2015/0288744 A1* | 10/2015 | Dwan | H04L 67/535 |
| | | | 709/217 |
| 2018/0096260 A1* | 4/2018 | Zimmer | G06N 5/025 |
| 2019/0057378 A1 | 2/2019 | Rudnick et al. | |
| 2019/0132344 A1 | 5/2019 | Lem et al. | |
| 2019/0180193 A1 | 6/2019 | Sinha et al. | |
| 2019/0217191 A1* | 7/2019 | Colenbrander | A63F 13/90 |
| 2019/0260784 A1 | 8/2019 | Stockdale et al. | |
| 2020/0195508 A1* | 6/2020 | Benjamin | H04L 63/20 |
| 2021/0004409 A1* | 1/2021 | Zamora Duran | G06F 16/908 |
| 2021/0185058 A1 | 6/2021 | Gitelman et al. | |
| 2023/0088415 A1* | 3/2023 | Friedlander | H04L 63/1425 |
| | | | 726/23 |

FOREIGN PATENT DOCUMENTS

| | | |
|---|---|---|
| RU | 2750554 C2 | 6/2021 |
| WO | 2018057945 A1 | 3/2018 |

* cited by examiner

TECHNIQUES FOR ENRICHING DEVICE PROFILES AND MITIGATING CYBERSECURITY THREATS USING ENRICHED DEVICE PROFILES

TECHNICAL FIELD

The present disclosure relates generally to threat mitigation in cybersecurity, and more specifically to enriching device profiles for use in detection and mitigation of cybersecurity threats.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that threats are detected accurately and appropriate mitigation actions are taken.

The challenge involved with profiling a user device is magnified by the fact there is no industry standard for querying and/or obtaining information from user devices, user devices, and so on. This challenge is particularly relevant when attempting to identify device attributes. As new types of devices come out frequently and there is not a single uniform standard for identifying type in data sent from these devices, identifying the types of devices accessing a network environment is virtually impossible.

More specifically, as device data is obtained from various sources, device attributes may be absent or conflicting in data from the various sources. For example, this may be caused by partial visibility over network traffic data due to deployment considerations, partial coverage due to sampled traffic data as opposed to continuously collected traffic data, continuous and incremental collection of device data over time, and conflicting data coming from different sources.

Due to incomplete device data, cybersecurity threats may not be detected until well after the threats begin an attack on a computer environment. As a result, data breaches, loss of data, unauthorized control, or other consequences of the cyber-attack may proceed unimpeded.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for device profile enrichment. The method comprises: determining a plurality of distributions of device attributes with respect to a plurality of fields of a predefined device profile schema; generating a plurality of inference rules based on the plurality of distributions of device attributes, wherein each inference rule indicates at least one required device attribute and at least one inferred device attribute; creating an ordered set of inference rules including the plurality of inference rules organized with respect to a plurality of scores, each score corresponding to one of the plurality of inference rules, wherein the score for each inference rule is determined based on the at least one required device attribute of the inference rule; and enriching at least one device profile by iterating the ordered set of inference rules, wherein enriching a device profile includes adding at least one device attribute value to the device profile.

Certain embodiments disclosed herein also include a non-transitory computer readable medium having stored thereon causing a processing circuitry to execute a process, the process comprising: determining a plurality of distributions of device attributes with respect to a plurality of fields of a predefined device profile schema; generating a plurality of inference rules based on the plurality of distributions of device attributes, wherein each inference rule indicates at least one required device attribute and at least one inferred device attribute; creating an ordered set of inference rules including the plurality of inference rules organized with respect to a plurality of scores, each score corresponding to one of the plurality of inference rules, wherein the score for each inference rule is determined based on the at least one required device attribute of the inference rule; and enriching at least one device profile by iterating the ordered set of inference rules, wherein enriching a device profile includes adding at least one device attribute value to the device profile.

Certain embodiments disclosed herein also include a system for device profile enrichment. The system comprises: a processing circuitry; and a memory, the memory containing instructions that, when executed by the processing circuitry, configure the system to: determine a plurality of distributions of device attributes with respect to a plurality of fields of a predefined device profile schema; generate a plurality of inference rules based on the plurality of distributions of device attributes, wherein each inference rule indicates at least one required device attribute and at least one inferred device attribute; create an ordered set of inference rules including the plurality of inference rules organized with respect to a plurality of scores, each score corresponding to one of the plurality of inference rules, wherein the score for each inference rule is determined based on the at least one required device attribute of the inference rule; and enrich at least one device profile by iterating the ordered set of inference rules, wherein enriching a device profile includes adding at least one device attribute value to the device profile.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for enriching device profiles as well as techniques for using such enriched device profiles to detect and mitigate cybersecurity threats. The various disclosed embodiments further provide techniques for enriching device profiles by generating enrichment rules based on device snapshots at different points in time.

In an embodiment, device profiles are created based on device attributes of various devices of a device population. The devices are grouped with respect to fields of a device profile schema. An ordered set of inference rules is created based on the device profiles and, more specifically, using the groupings of device profiles to determine distributions which can be used to identify statistically significant correlations among device attributes. Device profiles which are missing certain device attributes or having conflicting values for certain device attributes are enriched using the inference rules. Enriching the device profiles includes applying the inference rules in order to determine one or more inferred attributes that should be included in each device profile and adding values of the inferred attributes to respective fields of these device profiles, thereby enriching each device profile.

When the device profiles have been enriched such that they more accurately indicate information about the device, device activity may be monitored with respect to the enriched device profiles. More specifically, using the enriched device profiles, an appropriate known normal behavior of one or more devices having those device profiles may be determined. When activity by a device deviates from its respective known normal behavior, the activity may be identified as part of a cybersecurity threat and mitigated accordingly.

In an embodiment, the ordered set of inference rules includes distributions of device attributes that are determined with respect to the fields of the device profile schema. To this end, the distributions can be determined using counts of different groupings of devices. Each distribution illustrates counts of device profiles having a particular device attribute or combination of device attributes relative to a larger set of devices from the population. Inference rules are generated based on the distributions. Each inference rule includes one or more required attributes that are needed before the rule is invoked as well as one or more inferred attributes that are determined when any requirements of the inference rule are met. The inference rules are ranked based on significance using significance determination rules in order to create an ordered set of inference rules organized by significance.

The disclosed embodiments provide techniques that allow for automatically and accurately filling device profiles with inferred device attributes that are not clearly and explicitly indicated in device population data. Device profiles enriched as described herein more accurately describe their respective devices, thereby allowing for more accurately identifying appropriate normal behavior of the device. This, in turn, ensures that cybersecurity threats detected based on abnormal behavior are detected more accurately as compared to unenriched device profiles. Consequently, the disclosed embodiments allow for improving cybersecurity of a computing environment in which the device profile enrichment techniques are utilized.

Figure 1:
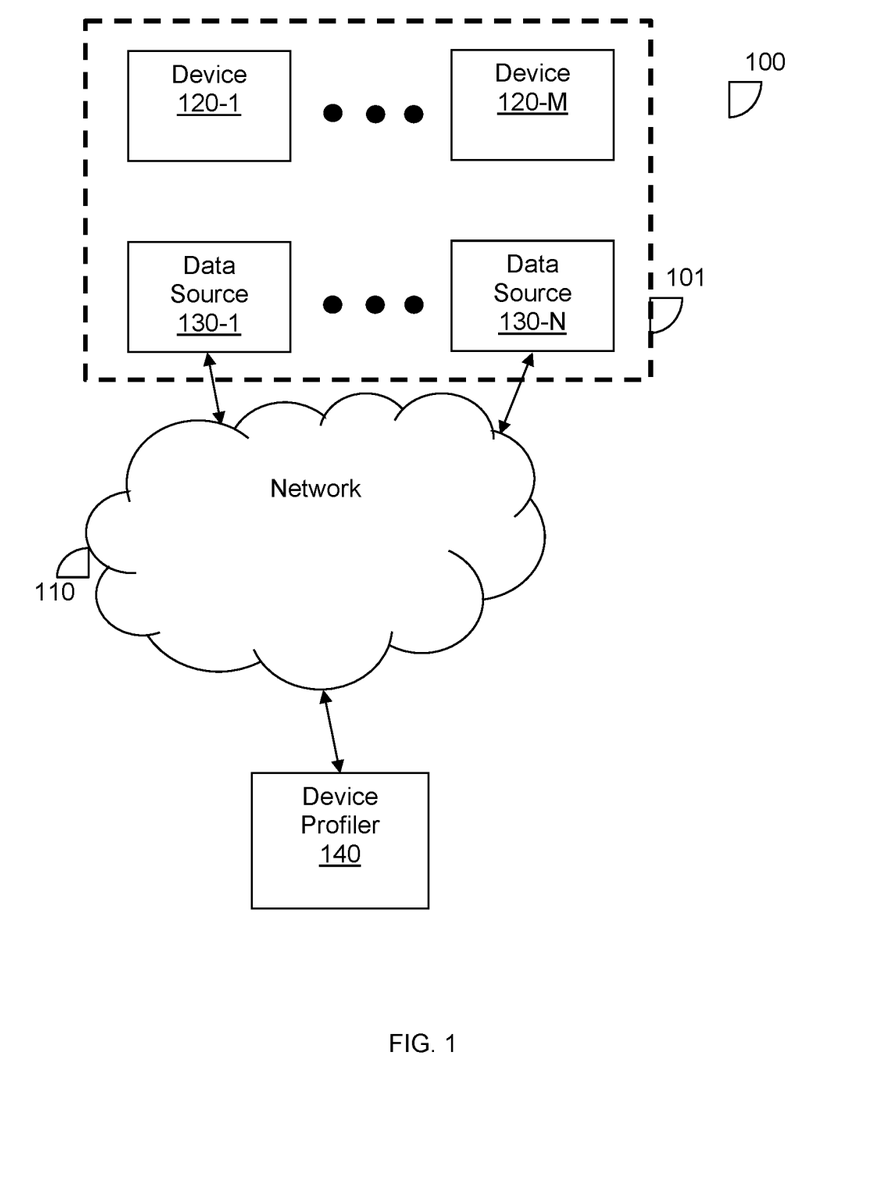
FIG. 1 is a network diagram utilized to describe various disclosed embodiments.

FIG. 1 shows an example network diagram 100 utilized to describe the various disclosed embodiments. In the example network diagram 100, data sources 130-1 through 130-N (hereinafter referred to as a data source 130 or as data sources 130) communicate with a device profiler 140 via a network 110. The network 110 may be, but is not limited to, a wireless, cellular, or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. The data sources 130 may be, but are not limited to, databases, network scanners, both, and the like. Data collected by or in the data sources 130 may be utilized to extract or infer device attribute data. The device attribute data is transmitted to the device profiler 140 for use in collecting data including device attributes to be utilized as described herein. To this end, such device attribute data at least includes strings representing respective information of the devices 120 (e.g., strings representing manufacturers of devices, operating systems used by devices, device models, categories of devices, types of devices, etc.).

Each of the devices 120 may be, but is not limited to, a personal computer, a laptop, a tablet computer, a smartphone, a wearable computing device, or any other device capable of receiving and displaying notifications. Each device 120 has respective strings indicating device attributes which may be included in data transmitted by the device 120. As discussed herein, such strings included in device data related to the device may be utilized to determine device attributes such as device type for each of the devices 120.

In an embodiment, the device profiler 140 is configured to enrich device profiles based on distributions of device attributes indicated in device data as described herein. In a further embodiment, the device profiler 140 is configured to use such enriched device profiles to detect and mitigate threats by determining an applicable device profile for a device based on device data related to activity of the device and identifying abnormal behavior of the device with respect to known normal behavior of devices having the same device profile.

In some implementations, the device profiler 140 is further configured to apply machine learning techniques as described herein in order to determine device attributes of the devices 120 based on respective strings indicated in the device attribute data extracted or inferred from the data obtained from the data sources 130.

It should be noted that the device profiler 140 is depicted as being deployed outside of the network environment 101 and the data sources 130 are depicted as being deployed in the network environment 101, but that these depictions do not necessarily limit any particular embodiments disclosed herein. For example, the device profiler 140 may be deployed in the network environment 101, the data sources 130 may be deployed outside of the network environment 101, or both.

Figure 2:
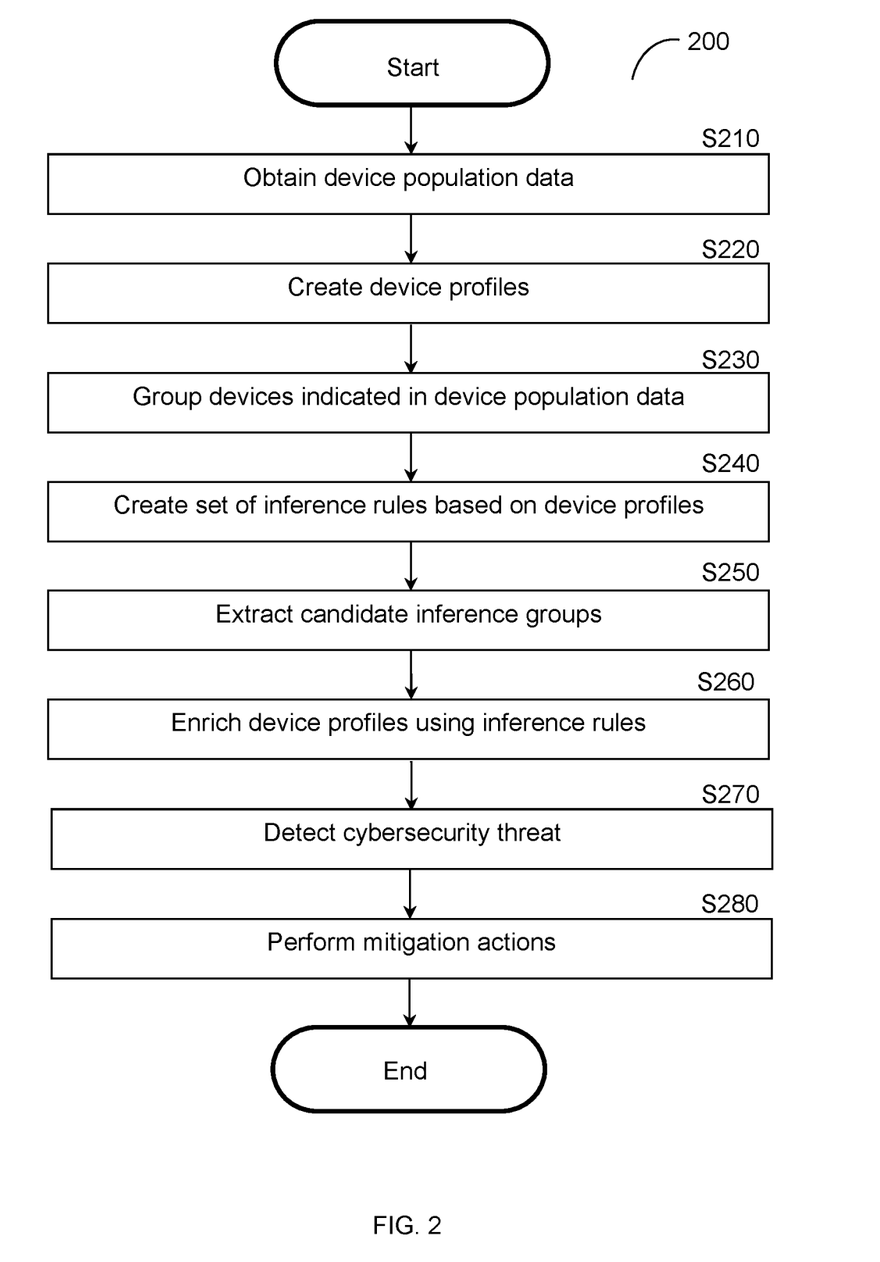
FIG. 2 is a flowchart illustrating a method for detecting and mitigating cybersecurity threats using enriched device profiles according to an embodiment.

FIG. 2 is a flowchart 200 illustrating a method for detecting and mitigating cybersecurity threats using enriched device profiles according to an embodiment.

At S210, device population data is obtained. The device population data at least includes device attributes of devices in the population. The device population data may be received from, for example, a database or scanner (e.g., one of the data sources 130, FIG. 1).

In some implementations, S210 may include determining device attributes using machine learning, for example as described in the above-referenced U.S. patent application Ser. No. 17/344,294.

At S220, device profiles are created based on device attributes of the devices indicated in the device population data. The device profiles are created by populating fields of device profile data structures using the device attributes. The fields of the device profile data structures may be defined by predetermined device profile schema.

In an embodiment, S220 further includes identifying potential device attributes in the device population data. Identifying the potential device attributes may include, but is not limited to, applying device attribute identification rules. The device attribute identification rules define different types of device attributes with respect to characteristics such as, but not limited to, specific values, data type, predetermined formats, combinations thereof, and the like.

At S230, devices represented by respective device profiles are grouped with respect to fields of the device profile schema used to define the device profiles. In an embodiment, devices are grouped into the same group when their respective device attributes in the device population data include the same or substantially similar values for each field of their respective profiles. Values may be substantially similar when, for example, they meet one or more requirements defined in substantial similarity rules. The substantial similarity rules may define, for example, predetermined sets of synonyms that are substantially similar, thresholds of character differences that are allowed for substantially similar values (e.g., a threshold number of characters difference), combinations thereof, and the like.

As a non-limiting example, when a device profile schema includes fields for manufacturer, operating system, device model, category, and type, all devices having device attributes indicating manufacturer "Apple," operating system "iOS," device model "iPhone X," category "smartphone," and type "iPhone" are grouped together.

In an embodiment, device groups for which device data is missing one or more predetermined attributes or includes inconsistencies among such predetermined attributes may be isolated at S230. The predetermined attributes may be attributes defined in a predetermined device profile schema that should be included in any given device profile. As a non-limiting example, a predetermined device profile schema may have fields for device attributes including manufacturer, operating system, device model, category, and type. If any of these fields is missing for devices in a given device group or if data related to a given device provides conflicting values among devices of the device group for any of these fields, then the device group is isolated such that the device group is not used for device profile creation. Once device attribute inference rules are created, they may be applied to any isolated device groups in order to resolve missing or inconsistent device attributes, thereby allowing for enriching device profiles for these device groups later.

At S240, a set of inference rules is created based on the device profiles. In an embodiment, S240 includes generating and ranking inference rules based on distributions of device attributes in order to create an ordered list of inference rules to act as the set of inference rules. An example method for creating a set of inference rules is now described with respect to FIG. 3.

Figure 3:
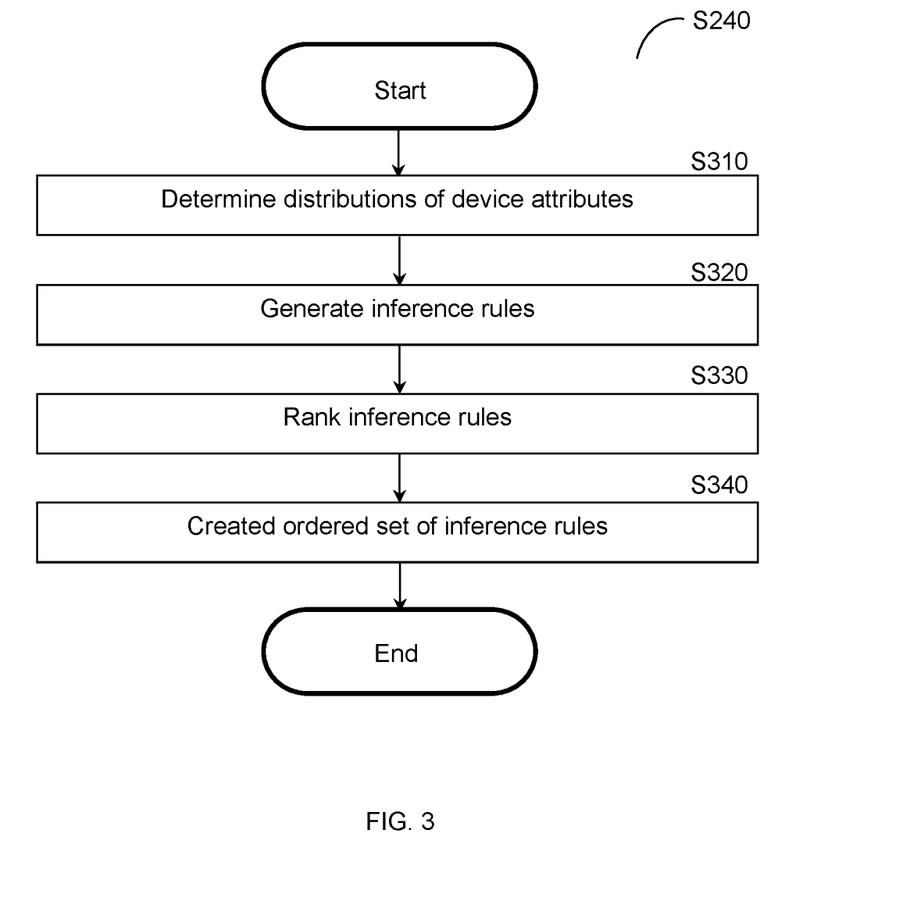
FIG. 3 is a flowchart illustrating a method for generating a set of inference rules according to an embodiment.

FIG. 3 is a flowchart S340 illustrating a method for generating a set of inference rules according to an embodiment.

At S310, distributions of the identified device attributes are determined with respect to fields of the predefined device profile schema. Each distribution is determined with respect to two or more fields of the schema. The distributions of device attributes are determined based on the groupings and indicate counts of devices having certain values for respective fields of their device profiles relative to a larger set of devices in the population that can, in turn, be utilized to determine statistical significance of different combinations of values.

As a non-limiting example, a distribution of devices with respect to manufacturer and type fields having "Apple" and "iPhone" as their respective values may indicate that 1,000,000 out of 1,000,007 devices having these values have "iOS" as the value for operating system and that 7 out of 1,000,007 devices have "Plasma OS" as the value for operating system.

Using distributions of devices to determine statistical significance of combinations of values allows for automatically learning correlations between different values which, in turn, can be used to enrich device profiles accurately. Moreover, using distributions can allow for further ranking correlations, thereby allowing for prioritizing certain correlations in the event that a given device profile includes a combination of values for fields that may meet the definitions of multiple correlations. This, in turn, improves accuracy of device profile enrichment.

At S320, inference rules are generated based on the device attribute distributions. The inference rules are defined with respect to combinations of values for specific fields and include both one or more required attributes and one or more inferred attributes. Each inference rule includes one or more requirements defined at least partially with respect to the required attributes. When an inference rule is applied to a device profile meeting all of the requirements defined therein, the inferred attributes of the inference rules are determined as applicable to that device profile. As a non-limiting example, an inferred attribute may be a value of "iOS" for an operating system such that, if a device profile meets the requirements of that inference rule, it is inferred that the device profile should include "iOS" in an operating system field.

In some embodiments, any combinations of values represented by at least a threshold value or proportion of devices are utilized to generate the inference rules. As a non-limiting example, such a threshold may be at least half of devices having certain other values such that, for the example distribution noted above where 1,000,000 out of 1,000,007 devices have "iOS" as operating system when other values of their respective device profiles include "Apple" and "iPhone," the inference rule generated based on this distribution defines required values of "Apple" and "iPhone" for manufacturer and model, respectively, corresponding to an inferred value of "iOS" for operating system.

At S330, the generated inference rules are ranked based on significance. More specifically, the inference rules are sorted in descending order based on their significance.

In an embodiment, S330 includes determining a significance score for each inference rule. The score for each inference rule may be determined using predetermined significance determination rules defined with respect to characteristics such as, but not limited to, number of required attributes in the combination (e.g., a rule requiring manufacturer and type would have 2 required attributes and a rule requiring model, manufacturer, and operating system would have 3 required attributes), a frequency of devices meeting the rule in the population (e.g., a number of devices in the population that have all required and inferred attributes defined by the rule), predetermined specificities of different fields, combinations thereof, and the like.

In particular, specificity of fields may be used to weight factors used for the scoring. In a further embodiment, the weights of fields may be summed for a given inference rule. As a non-limiting example, category may be assigned a weight of 1, type may be assigned a weight of 2, model may be assigned a weight of 5, manufacturer may be assigned a weight of 1, and operating system may be assigned a weight of 2. In a further example, a rule including manufacturer (weight=1) and operating system (weight=2) may have a summed weight of 3 (1+2).

In this regard, it is noted that less specific values (i.e., values which apply to more devices having varied device profiles) are less indicative of a given correlation such that weighting them appropriately further improves the accuracy of scoring and, consequently, of enrichment. Further, since the disclosed embodiments utilize correlations represented by combinations of values for respective fields, combining the weights allows for determining how much weight to apply to a given combination.

At S340, an ordered set of inference rules is created based on the rankings and the inference rules. In an embodiment, the set of inference rules is ordered based on the scores in descending order (i.e., from highest score to lowest score) such that more significant inference rules are applied before less significant inference rules. Consequently, in such an embodiment, when one inference rule has a set of required attributes met by a given device and is used to infer a value for a specific field (e.g., operating system), subsequent inference rules including inferred values for operating system are not used to enrich the device profile.

In an embodiment, the ordered set of inference rules may further include compound inference rules determined based on connected rules and inferences. Each compound inference rule is determined based on two or more other inference rules of the set of inference rules. The compound inference rules may include, but are not limited to, multiple inference rules leading to the same conclusion (e.g., multiple rules defining the same inferred values), a series of inference rules leading to a single conclusion with respect to inferred values, both, and the like.

In a further embodiment, the determining the compound inference rules further includes generating an inference graph having nodes representing inference rules and inferred values as well as edges representing connections between inference rules and their respective inferred values. Portions of the inference graph featuring more than two nodes are isolated and merged, with each isolated portion being represented in the merged graph as a sub-graph node. A compound inference rule is determined based on the intersection between inference rule nodes in the inference graph and one or more sub-graph nodes with no descendants or outgoing edges.

Returning to FIG. 2, at S250, candidate inference groups are extracted from the device groups. In an embodiment, the candidate inference groups are the device groups with missing or conflicting device attributes isolated as described above with respect to S230.

At S260, device profiles are enriched using the set of inference rules. In an embodiment, S260 includes applying the inference rules according to their order to determine the final values for any fields having missing or conflicting device attributes and adding the determined final values into the respective fields, thereby enriching the device profile. As noted above, the inference rules are ordered based on significance such that the inference rules are iterated from most significant to least.

As a non-limiting example, one of the inference rules may indicate that devices having both manufacturer "Apple" and model "iPhone" should be determined as having operating system "iOS" such the value for an operating system field for a device having "Apple" and "iPhone" values is determined to be "iOS."

At S270, device activity is monitored with respect to the enriched device profiles in order to detect a cybersecurity threat. In particular, the threat may be detected by determining an applicable device type for a device based on data related to activity of the device which indicates one or more attributes of the device (e.g., traffic data, scanner data, etc.) and identifying anomalies in behavior of the device based on known normal behavior of devices belonging to the same device profile. Such known normal behavior may be defined by predetermined normal behavior rules defined in a policy for devices having a given device profile, may be learned via machine learning (e.g., by training a machine learning model to output anomalies based on behavioral data), combinations thereof, and the like.

At S280, one or more mitigation actions are performed based on the detected cybersecurity threat. The mitigation actions may include, but are not limited to, severing communications between a device and one or more other devices or networks, generating an alert, sending a notification (e.g., to an administrator of a network environment), restricting access by the device, blocking devices (e.g., by adding such devices to a blacklist), combinations thereof, and the like. In some embodiments, devices having certain device attributes or combinations of device attributes may be blacklisted such that those device attributes are disallowed, and the mitigation actions may include blocking or severing communications with devices having the blacklisted device attributes.

Figure 4:
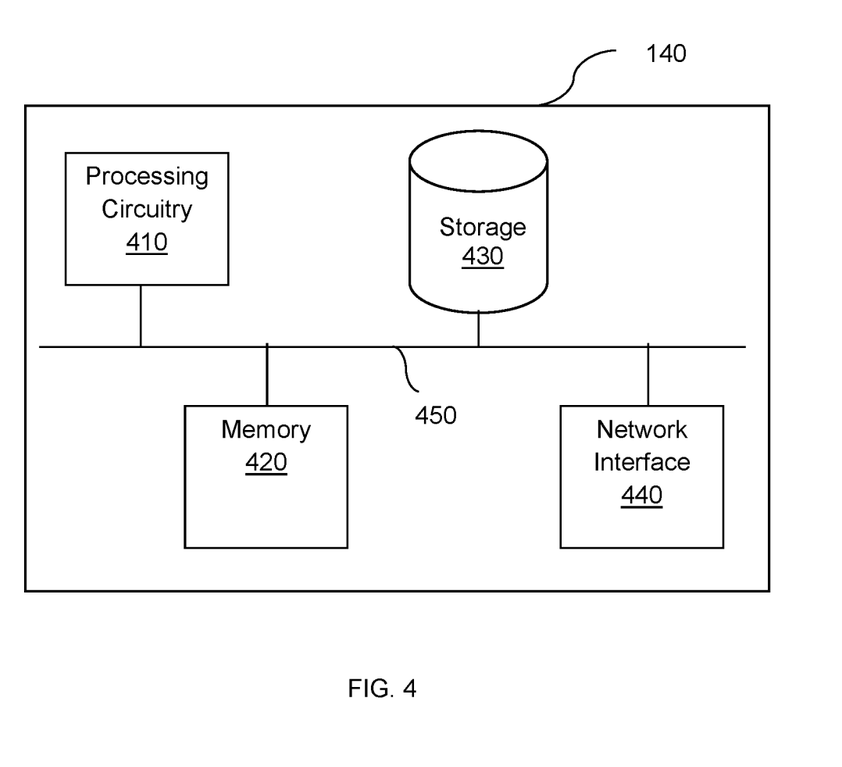
FIG. 4 is a schematic diagram of a device profiler according to an embodiment.

FIG. 4 is an example schematic diagram of a device profiler 140 according to an embodiment. The device profiler 140 includes a processing circuitry 410 coupled to a memory 420, a storage 430, and a network interface 440. In an embodiment, the components of the device profiler 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the device profiler 140 to communicate with, for example, the data sources 130, FIG. 1.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for device profile enrichment, comprising:
generating a plurality of distributions of device attributes for a set of devices, wherein each distribution comprises:
a first count of devices in a subset of devices that have a first value in a particular device attribute field; and
a second count of devices in the subset of the devices that have a second value in the particular device attribute field,
wherein the subset of devices comprises devices from the set of devices that have a unique combination of values for two or more device attribute fields of a predefined device profile schema;
generating a plurality of inference rules based on the plurality of distributions of device attributes, wherein each inference rule indicates at least one required device attribute and at least one inferred device attribute;
creating an ordered set of inference rules including the plurality of inference rules organized with respect to a plurality of significance scores, each significance score corresponding to one of the plurality of inference rules, wherein the significance score for each inference rule is determined based on the at least one required device attribute of the inference rule; and
enriching at least one device profile by iterating the ordered set of inference rules, wherein enriching a device profile includes adding at least one device attribute value to the device profile.

2. The method of claim 1, further comprising:
grouping device profiles of a plurality of device profiles into a plurality of device profile groups with respect to a plurality of device attribute fields of the predefined device profile schema, wherein the plurality of distributions is further determined based on the plurality of device profile groups.

3. The method of claim 2, further comprising:
isolating at least one of the plurality of device profile groups, wherein device profiles of each isolated device profile group are any of missing at least one device attribute and including at least one inconsistency among device attributes, wherein the at least one isolated device profile group is excluded when determining the plurality of inference rules.

4. The method of claim 3, further comprising:
enriching each device profile among the at least one isolated device profile group by iterating the ordered set of inference rules.

5. The method of claim 1, wherein the plurality of inference rules further includes at least one compound inference rule, wherein each compound inference rule is determined based on at least two other inference rules of the plurality of inference rules.

6. The method of claim 1, wherein the significance score for each inference rule is determined based further on at least one of: a number of required attributes of the inference rule, a frequency of devices meeting the inference rule in a device population; and a predetermined specificity of each of a plurality of device attribute fields of the predefined device profile schema.

7. The method of claim 6, wherein the specificity of each of the plurality of fields is used to weight factors for determining the plurality of significance scores.

8. The method of claim 1, further comprising:
detecting a cybersecurity threat based on the at least one enriched device profile and device activity; and
performing at least one mitigation action to mitigate the detected cybersecurity threat.

9. The method of claim 1, wherein a plurality of device attribute fields of the predefined device profile schema includes fields representing manufacturer, operating system, device model, category, and type.

10. A non-transitory computer readable medium having stored thereon instructions for causing a processing circuitry to execute a process, the process comprising:
generating a plurality of distributions of device attributes for a set of devices, wherein each distribution comprises:
a first count of devices in a subset of devices that have a first value in a particular device attribute field; and
a second count of devices in the subset of the devices that have a second value in the particular device attribute field,
wherein the subset of devices comprises devices from the set of devices that have a unique combination of values for two or more device attribute fields of a predefined device profile schema;
generating a plurality of inference rules based on the plurality of distributions of device attributes, wherein each inference rule indicates at least one required device attribute and at least one inferred device attribute;
creating an ordered set of inference rules including the plurality of inference rules organized with respect to a plurality of significance scores, each significance score corresponding to one of the plurality of inference rules, wherein the significance score for each inference rule is determined based on the at least one required device attribute of the inference rule; and
enriching at least one device profile by iterating the ordered set of inference rules, wherein enriching a device profile includes adding at least one device attribute value to the device profile.

11. A system for device profile enrichment, comprising:
a processing circuitry; and
a memory, the memory containing instructions that, when executed by the processing circuitry, configure the system to:
generate a plurality of distributions of device attributes for a set of devices, wherein each distribution comprises:
a first count of devices in a subset of devices that have a first value in a particular device attribute field; and
a second count of devices in the subset of the devices that have a second value in the particular device attribute field,
wherein the subset of devices comprises devices from the set of devices that have a unique combination of values for two or more device attribute fields of a predefined device profile schema;
generate a plurality of inference rules based on the plurality of distributions of device attributes, wherein each inference rule indicates at least one required device attribute and at least one inferred device attribute;
create an ordered set of inference rules including the plurality of inference rules organized with respect to a plurality of significance scores, each significance score corresponding to one of the plurality of inference rules, wherein the significance score for each inference rule is determined based on the at least one required device attribute of the inference rule; and
enrich at least one device profile by iterating the ordered set of inference rules, wherein enriching a device profile includes adding at least one device attribute value to the device profile.

12. The system of claim 11, wherein the system is further configured to:
group device profiles of a plurality of device profiles into a plurality of device profile groups with respect to a plurality of device attribute fields of the predefined device profile schema, wherein the plurality of distributions is further determined based on the plurality of device profile groups.

13. The system of claim 12, wherein the system is further configured to:
isolate at least one of the plurality of device profile groups, wherein device profiles of each isolated device profile group are any of missing at least one device attribute and including at least one inconsistency among device attributes, wherein the at least one isolated device profile group is excluded when determining the plurality of inference rules.

14. The system of claim 13, wherein the system is further configured to:
enrich each device profile among the at least one isolated device profile group by iterating the ordered set of inference rules.

15. The system of claim 11, wherein the plurality of inference rules further includes at least one compound inference rule, wherein each compound inference rule is determined based on at least two other inference rules of the plurality of inference rules.

16. The system of claim 11, wherein the significance score for each inference rule is determined based further on at least one of: a number of required attributes of the inference rule, a frequency of devices meeting the inference rule in a device population; and a predetermined specificity of each of a plurality of device attribute fields of the predefined device profile schema.

17. The system of claim 16, wherein the specificity of each of the plurality of fields is used to weight factors for determining the plurality of significance scores.

18. The system of claim 11, wherein the system is further configured to:
  detect a cybersecurity threat based on the at least one enriched device profile and device activity; and
  perform at least one mitigation action to mitigate the detected cybersecurity threat.

19. The system of claim 11, wherein a plurality of device attribute fields of the predefined device profile schema includes fields representing manufacturer, operating system, device model, category, and type.

* * * * *